Feb. 19, 1963

H. NARAGHI 3,077,862

AUTOMATIC LOADING MEANS FOR A TRAVELING FEEDER

Filed Nov. 28, 1960

INVENTOR
Hashem Naraghi

BY Webster & Webster
ATTORNEYS

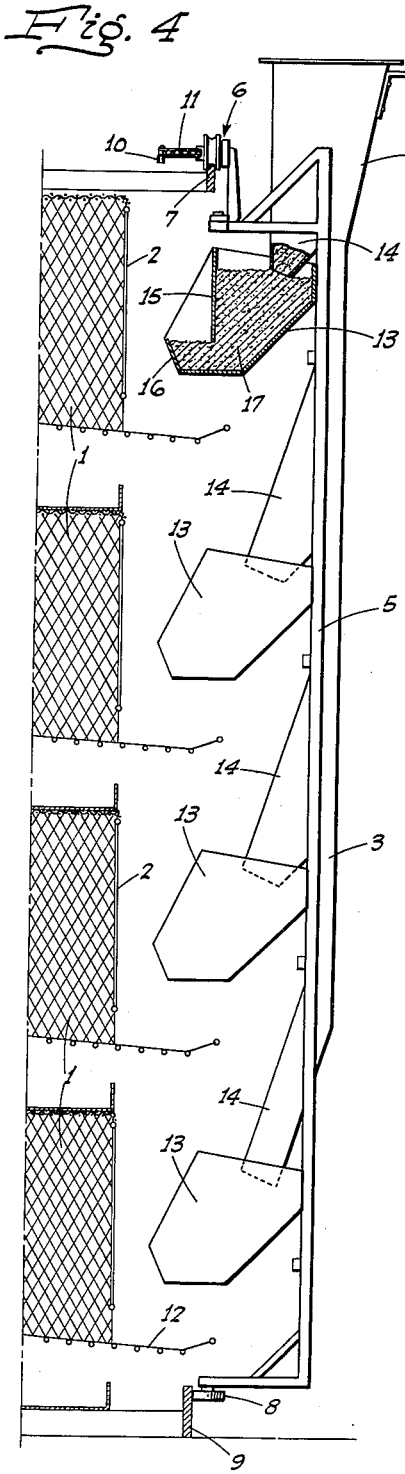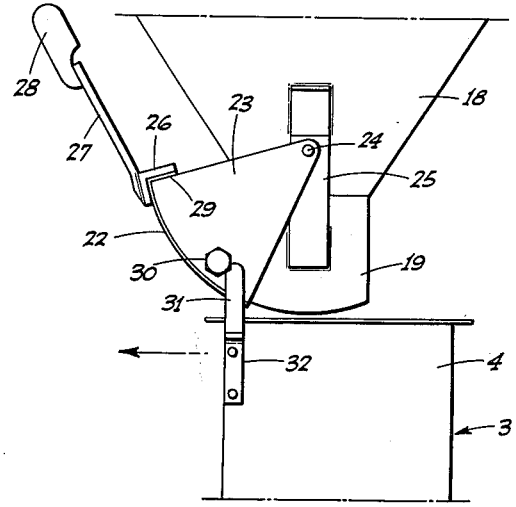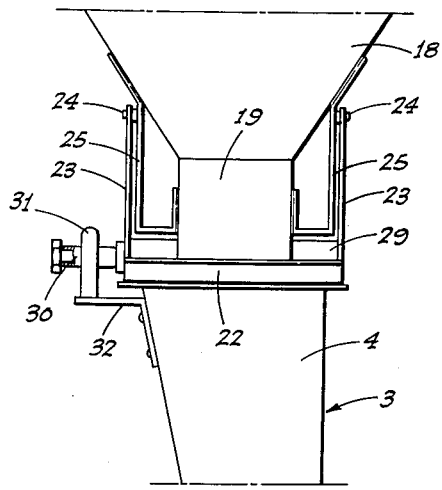

United States Patent Office 3,077,862
Patented Feb. 19, 1963

3,077,862
AUTOMATIC LOADING MEANS FOR A
TRAVELING FEEDER
Hashem Naraghi, Rte. 2, Box 750, Escalon, Calif.
Filed Nov. 28, 1960, Ser. No. 71,945
Claims priority, application Great Britain Mar. 17, 1960
7 Claims. (Cl. 119—52)

This invention relates to poultry feeding apparatus for use in connection with poultry-cage batteries of the type in which a plurality of cages are arranged in horizontal, vertically spaced tiers, all the cages facing in the same direction. An assembly of this type is shown in my copending application, Serial No. 752,083, filed July 30, 1958, for which the structure of the present invention has been particularly designed.

Apparatus of this general form usually includes a poultry feeding unit consisting of a frame movable along the tiers of cages in front of the same, and feed troughs on said frame from which the poultry can feed themselves as the troughs move past the tiers of cages at a slow speed.

Up to this time, however, as far as I am aware, it has been necessary to replenish the feed in the troughs by hand, and the major object of this invention is to provide a feed supply bin, and cooperating elements on the feeding unit and bin which will cause said feeding unit to be refilled every time such unit moves past the bin as it makes a pass along the tiers of cages.

The feeding unit in the present case includes a number of vertically spaced feed troughs, one for each vertically spaced tier of cages, and another object of the invention is to arrange the feed troughs in connection with the supply chute which forms a part of the feeding unit in such a manner that all the troughs will be equally filled upon the movement of the feeding unit past the supply bin, and irrespective of the fact that the feed in one trough may have been more exhausted than in another at the time of replenishment of the unit.

It is also an object of the invention to provide a practical, reliable, and durable automatic loading means for a traveling feeder which is practical, reliable, and durable, and one which is exceedingly effective for the purpose for which it is designed.

These objects are accomplished by means of such structure and relative arrangement of parts as will fully appear by a perusal of the following specification and claims.

In the drawings:

FIG. 2 is a similar view, showing the feeding unit as further advanced and opening the hopper spout.

FIG. 3 is a fragmentary end view of the feeding unit and hopper in the relative position as in FIG. 1, and looking forwardly.

FIG. 4 is an end or transverse elevation on a reduced scale, of the feeding unit, with one of the food troughs in section, and showing the unit as mounted in operative connection with a vertical battery or stack of horizontal elongated poultry cages.

Figure 1:
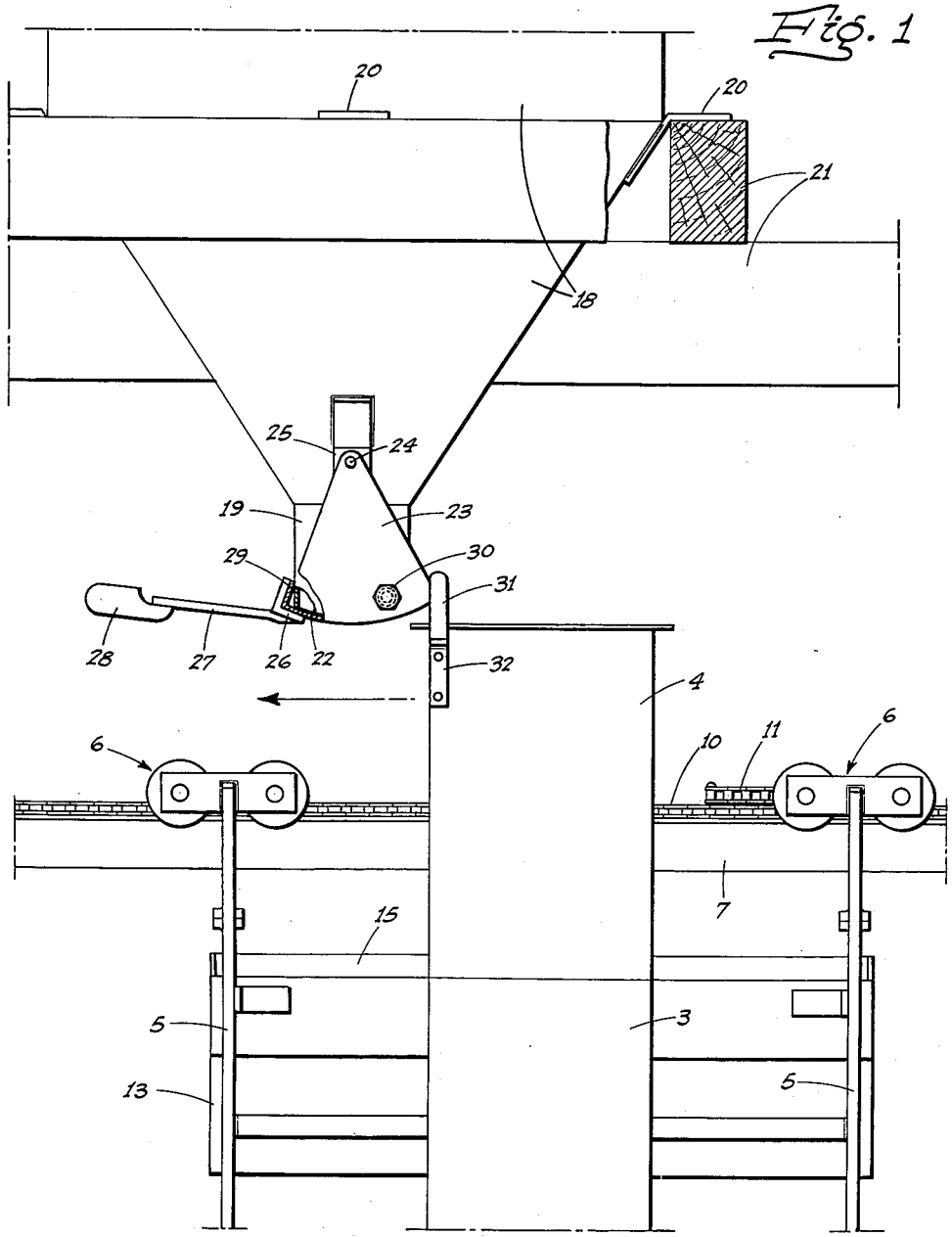
FIG. 1 is a fragmentary front elevation of a traveling poultry feeding unit shown as approaching the feed supply hopper, but before the spout of the latter is opened to admit feed to the feeding unit.

Referring now more particularly to the drawings and to the characters of reference marked thereon, the poultry cage battery with which the feeding unit illustrated herein cooperates is preferably that shown in said copending application Serial No. 752,083, filed July 30, 1958, now Patent No. 2,966,884, and comprises a plurality of horizontal tiers 1 arranged in generally stacked relation and provided in this case with front walls 2 of vertical grill form which confine the poultry but allows them to project their heads and necks therethrough.

The feeding unit which cooperates with the battery of cages comprises a transversely narrow vertical chute 3 which depends from, and is integral with, an open-topped funnel portion 4 which is relatively wide transversely. The chute is rigid with a vertical frame 5 having roller trucks 6 at its upper end, on opposite sides of the chute, and supported by a fixed rail 7 extending lengthwise of and above the cage battery a short distance in front of the same. At its lower end the frame 6 supports vertical-axis rollers 8 bearing against another longitudinal fixed rail 9 mounted below the cage battery.

The chute 3 is advanced along the tiers of cages at a slow speed by an endless horizontal driven chain 10 back of the roller trucks 6 and above rail 7 a short distance and connected to one of said trucks by a pull link 11. The rails 7 and 9 and the drive chain 10 are the same elements which support and drive the egg gathering structure shown in said copending application, and since the feed chute is connected to the chain in spaced relation to said structure, and they both of course travel at the same speed, neither one interferes with the other in its operation.

The frame 5 is arranged to maintain the chute 3 a certain distance in front of the tiers of cages and clear of the channels 12 which project forwardly from the floors of the tiers of cages, and onto which the eggs roll from said cages.

Fixed with the chute 3 and the chute 5 in the space between said chute and the front of the cages are feed troughs 13 preferably considerably longer than the width of the chute in a direction lengthwise of the tiers of cages, as shown in FIG. 1. These troughs are spaced apart vertically the same as the spacing of the tiers of cages 1, and in such relation horizontally to such cages as to be readily accessible to the poultry in the cages.

Downwardly sloping spouts 14 open from the adjacent side of the funnel at the bottom thereof and from the chute 3 below and feed into the various troughs 13 at the side thereof nearest the chute.

Each trough has a vertical partition 15 therein toward the open or poultry-facing side thereof which depends from the top of the trough to the bottom termination just below the top edge of the upstanding bottom lip 16 on the open side of the trough. This prevents the feed mash 17 from overflowing said lip in the event that the mash is piled up behind the partition to the level of the lower edge of the related feed spout 14, and which edge is near the top of the trough and a considerable distance above the lip, as shown in FIG. 1; said spout delivering into the trough between said partition and the side of the trough nearest the chute 3.

As will be noted, the various spouts 14 project a short distance only into the related troughs, and thus limit the height to which the troughs can be filled; the lower ends of the spouts being generally horizontal.

The feed in the chute is intermittently replenished, or after each pass of the feeding unit along the tiers of cages, by the following structure:

A feed supply bin 18, whose lower portion slopes down to a relatively small bottom discharge spout 19, is disposed above the feed unit, being supported by brackets 20 which engage a suitable framework 21.

The spout 19 is of somewhat smaller dimensions, in plan, than the upper end of the funnel 4 of the chute 3, and is positioned so as to be in the transverse plane of said funnel.

The lower end of the funnel is normally covered by a closure plate or gate 22 which is mounted for swinging movement in a direction lengthwise of the travel of the chute 3 by means of upstanding ears 23 on the sides of the plate 22 and which is somewhat wider than the spout, as clearly shown in FIG. 3.

The ears are transversely pivoted, as at 24, on brackets 25 secured on the spout 19 and the adjacent portions of the bin 18. The plate is curved concentric with the pivots 24, and the lower edge of the spout 19 is similarly curved.

The forward edge of the closure plate 22 is transversely reinforced by a bar 26 from which an arm 27 projects forwardly, said arm having a weight 28 on its forward end. The weight thus acts to swing the closure plate 22 rearwardly; such movement being limited to a fully closed position of the plate relative to the spout by means of an upstanding lip 29 on the forward edge of said plate which then engages the adjacent end of the spout 19.

Projecting transversely out from one of the ears 23 relatively close to the rear end thereof is a lug preferably in the form of a roller 30. This roller is disposed in the path of advancing movement of a rigid finger 31 which is mounted on, and upstands from, a bracket 32 secured on the related side of the upper end funnel of the chute 3 at the rear end of such portion.

It will therefore be seen that as the funnel 4, in its advancing movement along the battery of cages, reaches a position with said funnel beginning to underlie the spout 19, the finger 31 initially engages the roller 30. As the chute continues to advance, the finger pushes against said roller, swinging the closure plate 22 forwardly and opening the spout so that the latter may freely discharge into the funnel. The height of the finger is such that it remains engaged with the roller 30, before passing under the same, until the closure slate has been moved to a fully open position, as shown in FIG. 2, and the funnel 4 is directly under the said spout.

With the slow movement of the funnel 4 past the fixed and open feed spout 19, ample time is thus given for the chute 3 to be fully filled from said bin spout. As soon as the finger 31 advances clear of the roller 30, the weight 28 acts to swing the closure plate 22 back to a closed position, cutting off the flow from the spout by the time the chute funnel 4 moves ahead of the same.

The height of the funnel 4 is such that its upper end will be as close to the chute spout as possible as it passes under said spout, so that there is no chance of any feed being blown clear of the funnel in the space between said spout and funnel. This feature also prevents any appreciable spillage and waste of feed in the event that chute 3 becomes fully refilled before the supply spout of the bin is reclosed by passage of said chute past the spout.

Since the filling of any trough 13 is governed by the partition 15 and the positioning of the lower discharge end of the related spout 14 to the top of the trough, as previously pointed out, no trough can be overfilled by a fresh supply of feed discharged into the chute 2 from the bin spout 19, and the feed in the different troughs will be replenished only to the extent necessary.

It is to be noted that while the device of the present invention has been described as being for use in the feeding of caged poultry, such device can be employed equally well for feeding other kinds of animals, and whether in cages, pens, or other enclosures.

From the foregoing description it will be readily seen that there has been produced such a device as will substantially fulfill the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters of Patent are desired:

1. In a poultry cage assembly which includes a horizontal row of poultry cages, a feeding unit mounted for continuous movement along and in front of the row of cages and including a feed trough and a chute upstanding from and discharging into the trough, the chute being open at its upper end, a feed supply bin mounted in a fixed position above the row of cages, a discharge spout on the bin terminating at its lower end in close relationship to the plane of the upper edge of the chute and positioned to feed into the open end of the chute when the latter moves past the spout, a closure unit for the spout including a normally closed gate, and cooperating elements on the closure unit and chute to open said gate and hold the same open while the spout is in a feeding position relative to the chute.

2. In a poultry cage assembly which includes a horizontal row of poultry cages, a feeding unit mounted for continuous movement along and in front of the row of cages and including a feed trough and a chute upstanding from and discharging into the trough, the chute being open at its upper end, a feed supply bin mounted in a fixed position above the row of cages, a downwardly opening discharge spout on the bin positioned to feed into the open end of the chute when the latter moves past the spout, a normally closed gate for the lower end of the spout, means mounting the gate in connection with the spout for opening movement in the direction of movement of the feeding units along the row of cages, yieldable means normally holding the gate in a closed position, and cooperating elements on the mounting means and chute to move the gate to an open position and to hold the same open as the chute reaches and moves past the spout.

3. In a poultry cage assembly which includes a horizontal row of poultry cages, a feeding unit mounted for continuous movement along and in front of the row of cages and including a feed trough and a chute upstanding from and discharging into the trough, the chute being open at its upper end, a feed supply bin mounted in a fixed position above the row of cages, a downwardly opening discharge spout on the bin positioned to feed into the open end of the chute when the latter moves past the spout, a closure unit for the spout comprising a closure gate for the lower end of the spout, elongated ears upstanding from the gate on opposite sides of the spout and pivot means for the upper ends of the ears mounting the same in connection with the spout for swinging movement of the closure unit in a direction lengthwise of the row of cages, yieldable means normally maintaining the gate in a spout closing position while allowing said gate to move lengthwise to an open position in the direction of movement of the feeding unit, and cooperating elements on the closure unit and feeding unit to swing said first named unit about the pivot means as an axis to an open position of the gate and holding said gate open as the chute reaches the spout and while said chute is moving under the spout.

4. A structure, as in claim 3, in which said cooperating elements comprise a lug projecting outwardly from one ear, and a finger projecting upwardly from the corresponding side of the chute adjacent the leading end thereof in position to engage said lug, the height of the finger being such as to remain in engagement with the lug, upon advance of the feeding unit, until the closure gate has moved to a fully open position with the chute alined with the spout.

5. In an assembly which includes a horizontal structure which permits animals standing behind such structure to feed in front thereof, an upstanding chute mounted for continuous movement along and in front of said structure, a feed trough in front of such structure and into which trough the chute discharges, the chute being open at its upper end, a feed supply bin mounted in a fixed position above the path of movement of the chute, a discharge spout on the bin terminating at its lower end in close relationship to the plane of the upper edge of the chute and positioned to feed into the open end of the chute when the latter moves past the spout, a closure unit for the spout including a normally closed gate, and cooperating elements on the closure unit and chute to open said gate and hold the same open while the spout is in a feeding position relative to the chute.

6. In an assembly which includes a horizontal structure which permits animals standing behind such structure to feed in front thereof, an upstanding chute mounted for continuous movement along and in front of said structure, a feed trough in front of such structure and into which trough the chute discharges, the chute being open at its upper end, a feed supply bin mounted in a fixed position above the path of movement of the chute, a downwardly opening discharge spout on the bin positioned to feed into the open end of the chute when the latter moves past the spout, a normally closed gate for the lower end of the spout, means mounting the gate in connection with the spout for opening movement in the direction of movement of the chute, yieldable means normally holding the gate in a closed position, and cooperating elements on the mounting means and chute to move the gate to an open position and to hold the same open as the chute reaches and moves past the spout.

7. In an assembly which includes a horizontal structure which permits animals standing behind such structure to feed in front thereof, an upstanding chute mounted for continuous movement along and in front of said structure, a feed trough in front of such structure and into which trough the chute discharges, the chute being open at its upper end, a feed supply bin mounted in a fixed position above the path of movement of the chute, a downwardly opening discharge spout on the bin positioned to feed into the open end of the chute when the latter moves past the spout, a closure unit for the spout comprising a closure gate for the lower end of the spout, elongated ears upstanding from the gate on opposite sides of the spout and pivot means for the upper ends of the ears mounting the same in connection with the spout for swinging movement of the closure unit in the diretcion of movement of the chute, yieldable means normally maintaining the gate in a spout closing position while allowing said gate to move lengthwise to an open position in the direction of movement of the chute, and cooperating elements on the closure unit and chute to swing said unit about the pivot means as an axis to an open position of the gate and holding the gate open as the chute reaches the spout and while said chute is moving under the spout.

References Cited in the file of this patent
UNITED STATES PATENTS

| | | |
|---|---|---|
| 1,145,727 | White | July 6, 1915 |
| 1,555,250 | Ponticos | Sept. 29, 1925 |
| 1,629,979 | Steinback | May 24, 1927 |
| 2,314,344 | Cornell | Mar. 23, 1943 |
| 2,339,043 | Armstrong | Jan. 11, 1944 |
| 2,358,000 | Cornell | Sept. 12, 1944 |
| 2,663,466 | Heltzel | Dec. 22, 1953 |
| 2,735,400 | Stubbs | Feb. 21, 1956 |
| 2,746,423 | Runion | May 22, 1956 |

FOREIGN PATENTS

| | | |
|---|---|---|
| 657,920 | Great Britain | Sept. 26, 1951 |
| 200,038 | Australia | Nov. 2, 1955 |